United States Patent
Paleari

(10) Patent No.: US 10,045,555 B2
(45) Date of Patent: Aug. 14, 2018

(54) SHELF-STABLE SPREADABLE CREAM

(71) Applicant: Sofia Paleari, Sovico (IT)

(72) Inventor: Sofia Paleari, Sovico (IT)

( * ) Notice: Subject to any disclaimer, the term of this patent is extended or adjusted under 35 U.S.C. 154(b) by 189 days.

(21) Appl. No.: 14/854,372

(22) Filed: Sep. 15, 2015

(65) Prior Publication Data
US 2017/0071230 A1    Mar. 16, 2017

(51) Int. Cl.
| | |
|---|---|
| *A23L 1/20* | (2006.01) |
| *A23L 1/38* | (2006.01) |
| *A23L 19/00* | (2016.01) |
| *A23L 25/00* | (2016.01) |

(52) U.S. Cl.
CPC .............. *A23L 1/38* (2013.01); *A23L 19/03* (2016.08); *A23L 25/00* (2016.08)

(58) Field of Classification Search
CPC ............ A23L 1/38; A23L 19/03; A23L 25/00
USPC ................ 426/633, 518, 519, 521, 632, 639
See application file for complete search history.

(56) References Cited

U.S. PATENT DOCUMENTS

| | | | | |
|---|---|---|---|---|
| 2,198,219 | A * | 4/1940 | Musher | C11B 5/0085 106/263 |
| 2,217,701 | A * | 10/1940 | Musher | |
| 3,598,610 | A * | 8/1971 | Hawley | A23L 11/31 426/431 |
| 5,079,027 | A * | 1/1992 | Wong | A23L 25/10 426/518 |
| 2016/0316796 | A1* | 11/2016 | Marangoni | A23L 1/38 |

* cited by examiner

*Primary Examiner* — Helen F Heggestad
(74) *Attorney, Agent, or Firm* — Silvia Salvadori, P.C.; Silvia Salvadori

(57) ABSTRACT

The invention refers to a shelf-stable spreadable cream comprising, in dry weight percent, based on the total dry weight of the spreadable cream, 5-45% legumes and 5-55% nuts.

The invention also refers to a method for the production of the shelf-stable spreadable cream of the invention comprising the steps of: a) mixing the ingredients of a spreadable cream composition comprising, in dry weight percent, based on the total dry weight of the spreadable cream composition, 5-45% legumes and 5-55% nuts, thus obtaining an emulsified spreadable cream composition; b) heat treating the spreadable cream composition of step a); and c) packaging the emulsified spreadable cream composition.

The invention also refers to the shelf-stable spreadable cream obtainable by the method of the invention.

15 Claims, 2 Drawing Sheets

SHELF-STABLE SPREADABLE CREAM

BACKGROUND OF THE INVENTION

Spreadable creams are common in the market and include, for example, cocoa hazelnut creams (e.g. Nutella®) and peanut butter type spreads. Such products are highly appealing to consumers, especially children, and are very much used in the preparation of a tasty breakfast or a snack food.

However, many spreadable creams (or spreads) of the prior art suffer from a number of drawbacks. First of all, they are highly caloric. The market-leading cocoa-hazelnut spread in Italy has about 530 Kcal per 100 g of product. This product has a high fat content, typically 31 g per 100 g of product, of which 10 g are saturated fats and a very high sugar content, about 57 g per 100 g of product. Peanut butter has about 590 Kcal per 100 g and a fat content of about 50 g per 100 g of which 10 g are saturated fats.

On the other hand, the average consumer is becoming increasingly health-conscious and demanding as regards the nutritional quality of food and, as a consequence, tends to favor nutritionally wholesome foods, in particular those having a low calorie, low fat, in particular low saturated fat, and/or a relatively high fiber (or dietary fiber) composition. This is even more the case with regards to foods targeted for children.

The consumer is becoming particularly concerned, for example, about the fat composition profile of foods, and tends to favor low-fat foods and/or foods that contain a high ratio of unsaturated to saturated fatty acids. Saturated fatty acids are, in fact, known to be linked to heart disease. Typical sources of saturated fatty acids are notoriously animal fats, as well as some vegetable fats, such as palm oil and coconut oil.

The health-conscious consumer also tends to prefer the presence of vegetable oils/fats over animal fats as the former contain no cholesterol. Hypercholesterolemia is associated, in fact, with cardiovascular disease (linked to the development of atheroma in the arteries).

Also, a high-fiber diet is known to be linked to health benefits, such as decreased absorption of cholesterol, a lower risk of cancer, lower rise in blood glucose, to mention a few.

However, food products, in particular confectionery products such as spreadable creams, that are low in fats, in particular saturated fats, and in calories, tend to have poor texture and taste and therefore are not appealing to the consumer.

There is therefore a need in the field for a spreadable cream that is appetizing, but also nutritionally wholesome.

The technical problem underlying the present invention is therefore that of making available a shelf-stable spreadable cream that is comparatively low in calorie content and saturated fatty acids, while exhibiting optimal organoleptic characteristics, comparable or even superior to the conventional spreadable creams of the prior art.

A further technical problem underlying the present invention is that of making available such a shelf-stable spreadable cream which is relatively rich in micronutrients, such as vitamins and minerals.

A further technical problem underlying the present invention is that of making available such a shelf-stable spreadable cream which is substantially free of or low in trans fatty acids and cholesterol.

SUMMARY OF THE INVENTION

The above technical problem has been solved, according to the invention, by a shelf-stable spreadable cream comprising, in dry weight percent, based on the total dry weight of the spreadable cream, 5-45% legumes and 5-55% nuts.

With the term "spreadable cream" or "spread", what is meant throughout the present application is a soft food that is easy to spread (for example with a knife or a spoon) at a temperature between 4° C. and 25° C. Typically, spreadable creams have a viscosity between 8000 and 250000 cP at 20° C., as measured by a viscometer or a Rapid Visco Analyzer.

With the term "shelf-stable", what is meant throughout the present application is that the spreadable cream is microbiologically and organoleptically stable at room temperature for at least 6 months, preferably at least 9 months.

With the term "organoleptically stable" what is meant is that the spreadable cream does not exhibit any substantial flavor degradation or phase separation, and thus preserves its optimal organoleptic properties.

The term "legume(s)" is used throughout the present application in its general culinary, not strictly botanical, meaning, the latter indicating food grain seeds (or pulses) of a plant in the Fabaceae (or Leguminosae) family. Examples of food grain seeds are beans, lentils, lupins, peas and peanuts. For the purposes of the present applications, however, the term "legume(s)" or "pulse(s)" does not include peanuts, as these are more commonly considered as belonging to the category of "nuts".

The term "nut(s)" is used throughout the application in its general culinary, not strictly botanical, meaning, and is thus taken to indicate fruits composed of a hard shell and an edible oily seed, such as for example almonds, pecans, pistachios, walnuts, candlenut, cashew nuts, hazelnuts, Chilean hazelnuts, macadamia, Malabar chestnuts, mongongo, peanuts, pine nuts, yeheb nuts and Brazil nuts.

Preferably, the shelf-stable spreadable cream comprises, in dry weight percent, based on the total dry weight of the spreadable cream, 5-30%, more preferably 7-25%, most preferably 8-20% legumes; and 5-45%, more preferably 15-35%, most preferably 20-30% nuts.

Preferably, the shelf-stable spreadable cream has a moisture content, in weight percent, based on the total weight of the spreadable cream, of at least 1%, more preferably at least 5%, even more preferably at least 15%, even more preferably at least 20%, even more preferably at least 30%, even more preferably at least 40%, even more preferably at least 50%, most preferably at least 60%.

The moisture content is measured according to the standard method of oven drying.

Preferably, the shelf-stable spreadable cream of the invention is an oil-in-water emulsion.

Preferably, the shelf-stable spreadable cream comprises, in dry weight percent, based on the total dry weight of the spreadable cream, 0.60-24%, more preferably 0.60-16%, even more preferably 1-13%, most preferably 1-10% legume protein.

Preferably, the legumes are chosen in the family of the Fabaceae (or Leguminosae), more preferably among one or more of the genera *Vigna, Vicia, Cicer, Phaseolus, Macrolyloma, Lablab, Canavalia, Lathyrus, Lens, Lupinus, Pisum, Cajanus, Glycine, Mucuna, Sitzolobium, Psophocarpus*, even more preferably in the group comprising the common beans (or *Phaseolus vulgaris*), for example cannellini beans, navy beans, great northern beans, white beans, white kidney beans, small white beans, kidney beans, wax beans, pinto beans, and cranberry beans (or borlotti), most preferably cannellini beans.

Preferably, the legumes have, in dry weight percent, based on the total dry weight of the legumes, a protein content comprised between 12 and 53%, more preferably comprised between 17 and 30%, a total carbohydrates content, including dietary fiber, comprised between 15 and 76%, more preferably comprised between 45 and 75%, a lipids content comprised between 0.2 and 26%, more preferably comprised between 1 and 5%, and/or an ash content comprised between 1.8 and 7%, more preferably comprised between 2.5 and 4.5%.

Preferably, the legumes have an albumins to globulins ratio, expressed on a dry weight basis, comprised between 0.03 and 3.0, more preferably comprised between 0.13 and 1.0.

Preferably, the legumes have a water holding capacity (WHC) comprised between 1.0 and 6.0 g/g, more preferably comprised between 1.5 and 4.5 g/g.

Preferably, the legumes have an oil holding capacity (OHC) comprised between 0.40 and 5.0 g/g, more preferably comprised between 1.0 and 2.5 g/g.

Preferably, the legumes are legume isolates and/or whole legumes, more preferably whole legumes.

Preferably, the legume isolates are chosen in the group comprising legume protein, legume fiber, legume extract, and mixtures thereof.

Preferably, the whole legumes are processed whole legumes, more preferably chosen in the group comprising whole-legume meal, whole-legume flour, whole-legume paste, and combinations thereof, more preferably whole-legume flour, even more preferably whole-legume flour including the hull.

Preferably, the whole-legume flour is a pre-cooked flour, more preferably an instant flour.

With the expression "whole legume(s)" what is meant is all the (edible) parts of a whole legume.

Preferably, the nuts are chosen in the group comprising almonds, pecans, pistachios, walnuts, candlenut, cashew nuts, hazelnuts (or cobnut or filbert nut), Chilean hazelnuts, macadamia, Malabar chestnuts, mongongo, peanuts, pine nuts, yeheb nuts, Brazil nuts and mixtures thereof, more preferably hazelnuts, walnuts and/or peanuts, most preferably hazelnuts.

Preferably, the legumes and/or the nuts have an average particle size of 500 µm or less, more preferably 100 µm or less, most preferably 50 µm or less.

Preferably, the shelf-stable spreadable cream is a sweet spreadable cream.

Preferably, the shelf-stable spreadable cream further comprises, in dry weight percent, based on the total dry weight of the spreadable cream, 1-70%, more preferably 40-65%, most preferably 45-63% of a sweetening agent.

Preferably, the sweetening agent is chosen in the group comprising glucose, glucose syrup, fructose, sucrose, maltose, grape sugar, honey, agave syrup, brown rice syrup, corn syrup, high fructose corn syrup (HFCS), inverted sugar, liquid sugar, molasses, pear and/or apple juice concentrate, powdered sugar, table sugar (refined sucrose), brown sugar, lactose and mixtures thereof, more preferably grape sugar and/or honey, most preferably grape sugar.

Preferably, the grape sugar has a Brix value comprised between 50 and 90 degrees Brix, more preferably between 50 and 80 degrees Brix, most preferably between 60 and 75 degrees Brix.

Preferably, the grape sugar is obtained by a process of grape must concentrate rectification.

Grape sugar is sometimes also referred to as "concentrated grape sugar", "concentrated grape juice", "grape juice", "deionized concentrated grape juice", "rectified concentrated grape must", depending on the manufacturer.

Preferably, grape sugar consists of 48-52% fructose, 46-50% glucose and about 2% other sugars.

Preferably, the honey has a Brix value comprised between 50 and 90 degrees Brix, more preferably between 50 and 80 degrees Brix, most preferably about 80 degrees Brix.

Preferably, the shelf-stable spreadable cream further comprises, in dry weight percent, based on the total dry weight of the spreadable cream, 1-30%, more preferably 1-6%, even more preferably 2-5% of a flavoring ingredient.

Preferably the flavoring ingredient is chosen from the group comprising: cocoa; chocolate; white chocolate; vanilla; nougat; gianduja; coffee; mint; and fruits, such as for example orange, cherry, strawberry, cranberry, blueberry, or similar fruits of the *Vaccinium* genus; and mixtures thereof, more preferably cocoa, most preferably powdered cocoa.

By the term "flavoring ingredient" what is meant in the present application is an ingredient, other than legumes, nuts and, if any, sweetening agent, that contributes in a significant way to the overall flavor of the spreadable cream.

Preferably, the shelf-stable spreadable cream is free of artificial flavorings.

In a preferred embodiment, the shelf-stable spreadable cream is a cocoa-hazelnut spreadable cream.

According to a preferred embodiment of the invention, the shelf-stable spreadable cream comprises, in dry weight percent, based on the total dry weight of the spreadable cream, 5-45%, more preferably 5-30%, even more preferably 7-25%, most preferably 8-20% cannellini beans; 5-55%, more preferably 5-45%, even more preferably 15-35%, most preferably 20-30% hazelnuts; 1-70%, more preferably 40-65%, most preferably 45-63% grape sugar; and 1-30%, more preferably 1-6%, most preferably 2-5% cocoa.

Preferably, the shelf-stable spreadable cream comprises, in weight percent, based on the total weight of the spreadable cream, 1-15%, more preferably 3-15%, even more preferably 4.5-15%, even more preferably 6-15%, even more preferably 7-15%, most preferably 14-15%, dietary fiber; 5-40%, more preferably 5-25%, even more preferably 10-20%, most preferably 12-16% total fats; and/or less than 10%, more preferably less than 5%, even more preferably less than 3%, most preferably less than 1.5% saturated fatty acids.

According to the US Code of Federal Regulations (CFR) 21CFR101.62 (c)(i), the term "low in saturated fat" may be used on the label or in the labeling of foods, provided that the food contains 1 g or less of saturated fatty acids per reference amount costumarily consumed and not more than 15 percent of calories from saturated fatty acids.

Preferably the shelf-stable spreadable cream is low in saturated fat.

According to the US Code of Federal Regulations (CFR) 21CFR101.54 (e), the terms "good source", "contains", or "provides" may be used on the label and in the labeling of foods, provided that the food contains 10 to 19 percent of the RDI or the DRV per reference amount customarily consumed.

According to the US Code of Federal Regulations (CFR) 21CFR101.54 (b), the terms "high", "rich in", or "excellent source of" may be used on the label and in the labeling of foods, provided that the food contains 20 percent or more of the RDI or the DRV per reference amount customarily consumed.

In the case of the spreadable cream of the invention in relation to its dietary fiber content, 10% and 20% of the RDI per reference amount customarily consumed corresponds to a 7% and 14% content of dietary fiber, respectively.

According to the Annex to CE 1924/2006 Regulation, a claim that a food is a source of fiber may only be made where the product contains at least 3 g of fiber per 100 g; a claim that a food is high in fiber may only be made where the product contains at least 6 g of fiber per 100 g.

Preferably the shelf-stable spreadable cream is a source of fiber, more preferably high in fiber.

Added protein can also be present in the shelf-stable spreadable cream. Such protein can be chosen in the group that comprises animal proteins (e.g. dairy, such as milk proteins, whey, and milk protein hydrolysates) and/or plant proteins. Preferably, however, the shelf-stable spreadable cream does not contain any added protein.

With the term "added protein" what is meant here is protein other than that provided by the legumes, nuts, and, if any, flavoring ingredient and sweetening agent of the shelf-stable spreadable cream of the present invention.

Added fats and/or oils can also be present in the shelf-stable spreadable cream. Such fats and/or oils can be chosen in the group comprising olive oil, canola oil, peanut oil, nuts and seeds oil, safflower oil, sesame oil, sunflower oil, corn oil, soybeans oil, walnut oil, pecans oil, pine nuts oil, avocado oil, coconut oil, margarines, butter, palm oil, palm kernel oil, cocoa butter and mixtures thereof. Preferably, however, the shelf-stable spreadable cream does not contain any added fats and/or oils.

With the expression "added fats and/or oils" what is meant here is fats and oils other than those provided by the legumes, nuts, and, if any, flavoring ingredient and sweetening agent of the shelf-stable spreadable cream of the present invention.

Preferably, the spreadable cream has an energetic value of 450 Kcal per 100 g of product or lower, more preferably 400 Kcal or lower, even more preferably 360 Kcal or lower, most preferably 250 Kcal or lower.

The term "dietary fiber" (or fiber) is used throughout the application with a meaning according to the AACC report of the Dietary Fiber Definition Committee to the Boards of Directors of the American Association of Cereal Chemists (Cereal Foods World, March 2001, Vol. 46, No. 3, pp-112-126).

The values relating to the nutritional information for the shelf-stable spreadable cream of the invention, which includes fats, carbohydrates (including dietary fiber), proteins and energetic value (Kcal) are calculated on the basis of the ingredients making up the spreadable cream with reference to USDA National Nutrient Database for Standard Reference and the Italian INRAN database (of the Istituto Nazionale di Ricerca per gli Alimenti e la Nutrizione).

Preferably, the water activity ($a_w$) of the shelf-stable spreadable cream is comprised between 0.55 and 0.95, more preferably between 0.60 and 0.85, even more preferably 0.65 and 0.80

The water activity is measured according to the standard dew-point method (using a dew point $a_w$ meter).

Preferably, the viscosity (cP) of the shelf-stable spreadable cream at 20° C. is comprised between 8000 and 200000 cP, more preferably between 25000 and 130000 cP, even more preferably between 30000 and 50000 cP.

Preferably, the pH of the shelf-stable spreadable cream is comprised between 4.0 and 6.0, more preferably about 5.5. The pH value of the spreadable cream affects the solubility of the proteins. By adjusting the pH to an optimal value it is possible to achieve protein stability and therefore the desired texture.

Preferably, the shelf-stable spreadable cream is free of chemical preservatives. The term "chemical preservative" is here defined according to the definition provided by the US Food and Drug Administration (FDA), according to which, the term "preservative" refers to "any chemical that, when added to food, tends to prevent or retard deterioration thereof but does not include common salt, sugars, vinegars, spices, or oils extracted from spices, substances added to food by direct exposure thereof to wood smoke, or chemicals applied for their insecticidal or herbicidal properties" (CFR—Code of Federal Regulations Title 21 Sec. 101.22).

Preferably, the shelf-stable spreadable cream contains no added emulsifiers. The term "emulsifiers" is here defined according to the definition provided by the US Food and Drug Administration (FDA), according to which, the term "emulsifier" refers to "substances which modify surface tension in the component phase of an emulsion to establish a uniform dispersion or emulsion" (CFR—Code of Federal Regulations Title 21 Sec. 170.3).

With the term "added emulsifier" what is meant here is any emulsifier other than those provided by the legumes, nuts, and, if any, flavoring ingredient and sweetening agent (in particular the legume and nut proteins) of the shelf-stable spreadable cream of the present invention.

Preferably, the shelf-stable spreadable cream is gluten-free.

Preferably, the shelf-stable spreadable cream is free of lactose or milk-derived or dairy ingredients.

Preferably, the shelf-stable spreadable cream contains only ingredients of plant origin.

Preferably, the shelf-stable spreadable cream is cholesterol-free.

Preferably, the shelf-stable spreadable cream is free of trans fatty acids.

Preferably, the shelf-stable spreadable cream of the present invention is free of added salt, in particular sodium salt.

In another aspect, the present invention refers to a method for the production of the shelf-stable spreadable cream of the invention comprising the steps of:

a) mixing the ingredients of a spreadable cream composition comprising, in dry weight percent, based on the total dry weight of the spreadable cream composition, 5-45% legumes and 5-55% nuts, thus obtaining an emulsified spreadable cream composition;

b) heat treating the spreadable cream composition of step a); and c) packaging the emulsified spreadable cream composition.

Preferably, the legumes are legume isolates and/or whole legumes.

Preferably, the legume isolates are provided in step a) in the form of a powder.

Preferably, the whole legumes are provided in step a) in a form chosen in the group comprising unbroken legume, whole-legume meal, whole-legume flour, whole-legume paste, and combinations thereof, more preferably whole-legume flour, even more preferably whole-legume flour including the hull.

Preferably, the whole-legume flour is a pre-cooked flour, more preferably an instant flour.

Preferably, the nuts are provided in step a) in the form chosen in the group comprising whole nuts, broken nuts, ground nuts, paste, powder, and a combination thereof, more preferably in the form of a paste.

Preferably, the spreadable cream composition comprises a flavoring ingredient.

Preferably, the flavoring ingredient, more preferably cocoa, is provided in step a) in the form of a liquid and/or a powder, more preferably a powder.

Preferably, the spreadable cream composition comprises a sweetening agent.

Preferably, the sweetening agent, more preferably the grape sugars, is provided in step a) in solid (e.g. crystallized) and/or liquid form, more preferably in liquid form.

Grape sugars in liquid form can contribute to the formation of an optimal spreadable texture of the cream.

Preferably, the grape sugar is obtained by a process of grape must concentrate rectification.

Preferably, the mixing step a) comprises subjecting two or more of the ingredients of the spreadable cream composition to a high performance treatment.

Advantageously, the high performance treatment of mixing step a) comprises any comminuting, compressing, refining, grinding, or shearing process that provides both size reduction and mixing of the two or more of the ingredients of the spreadable cream composition. The achievement of a small average particle size of such ingredients helps the formation of a creamy texture and a stable emulsion.

Preferably, in step a), the high performance treatment is carried out in a batch tank.

Preferably, the high performance treatment of mixing step a) is selected from the group comprising: shearing with rotating tools, for example rotating knives or rotating blades; compressing between rotating cylinders; grinding; refining; and combinations thereof, more preferably refining, most preferably refining in a ball mill refiner.

Preferably, the ball mill refiner is provided with a rotating shaft with arms.

Preferably, the ball mill refiner is provided with cooling means to counteract the excessive heat production caused by friction between the spheres thus maintaining a desired working temperature.

Ball mill refiners are vertical or horizontal cylinders (stationary tank), containing grinding media (usually steel balls). The mass to be processed and the balls are agitated, for example by a shaft with arms or by rotation of the cylinder itself, rotating at a variable speed.

Generally, size reduction is achieved by a single mechanical force (compression, impact or shear) that causes rupture, which is usually predominant. The ball mill refiner, instead, provides the advantage that the composition is comminuted between the grinding media (more preferably, steel balls), the stirrers and the tank wall by both compression and shear. This in turn makes the process more efficient and less time consuming.

Preferably, the high performance treatment of step a) is carried out at a peripheral speed of 20-500 rpm, more preferably 50-100 rpm.

Preferably, the high performance treatment of step a) is carried out until an average particle size of the two or more of the ingredients of the spreadable cream composition of 500 µm or less, more preferably 100 µm or less, most preferably 50 µm or less is obtained.

Preferably, the high performance treatment of step a) is carried out for 10 hours or less, more preferably 6 hours or less.

Preferably, the high performance treatment of step a) is carried out at a temperature comprised between 20-130° C., more preferably 20-60° C., most preferably at room temperature.

Preferably, in the high performance treatment of step a), the two or more of the ingredients of the spreadable cream composition consist of dry ingredients.

Preferably, in the high performance treatment of step a), the two or more of the ingredients of the spreadable cream composition comprise the legumes and the nuts.

Preferably, in step a), the high performance treatment is preceded by a pre-mixing step a') of two or more of the ingredients of a spreadable cream composition, more preferably at a lower shear rate than the high performance treatment.

Preferably, in step a') of pre-mixing, the two or more of the ingredients of the spreadable cream composition are dry ingredients only.

Preferably, in step a), the high performance treatment is followed by a step a") of further mixing the ingredients of the spreadable cream composition.

Preferably, in step a") of further mixing the ingredients of the spreadable cream composition, said ingredients are all the ingredients of the spreadable cream composition.

Preferably, the pre-mixing of step a') and/or the further mixing of step a") are carried out by a process selected from the group comprising: shearing with tools, for example rotating knives, rotating blades or rotating cylinders; mixing with rotating tools, for example rotating arms; kneading; and combinations thereof, preferably shearing with rotating blades.

Preferably, the pre-mixing of step a') and/or the further mixing of step a") are carried out in a batch tank.

Preferably, the pre-mixing of step a') and/or the further mixing of step a") are carried out in a mixing machine chosen from the group comprising: mixer with rotating tools, for example rotating blades, rotating arms, rotating knives or rotating cylinders; kneading machine; and combinations thereof, more preferably a mixer with rotating blades.

Preferably, the heat treatment of step b) is a pasteurization or a sterilization, more preferably a sterilization.

Preferably, step b) of heat treatment comprises subjecting the spreadable cream composition to a heat treatment at 60-130° C. for 3-1800 seconds, preferably 70-95° C. for 15-1200 seconds, more preferably 75-95° C. for 15-900 seconds.

Preferably, the heat treatment of step b) is carried out by the use of a scraped surface heat exchanger.

It is within the skills of the skilled person in the field to adjust or vary the heat treatment parameters depending on the circumstances to achieve the same effect.

As known in the field, in order for the heat treatment to achieve the desired effect, it is important to make sure that all the parts of the spreadable food composition reach the desired temperature. Any "pockets" of composition that remain untreated or partially treated would in fact represent a safety hazard.

According to a preferred embodiment, the heat treatment of step b) is carried out on the emulsified spreadable composition after the mixing step a).

According to an alternative embodiment, the heat treatment of step b) is carried out on the spreadable composition at least partly during the mixing step a).

Preferably, the packaging step c) comprises filling the emulsified spreadable cream into containers.

According to a preferred embodiment, the packaging step c) is carried out after heat treatment step b), preferably by way of hot-filling into containers.

According to an alternative preferred embodiment, the packaging step c) is carried out prior to heat treatment step b).

Preferably, said containers are separately sterilized, prior to filling, at 70-130° C. for 3-1800 seconds, preferably in a vapor tunnel.

Preferably, the containers have a capacity of 30 to 3000 ml, more preferably 100 to 1000 ml.

The containers can be in the form of a jar, a tube, a can, a bottle, a pouch, or any other container that is suitable, once sealed, for preserving a food at room temperature.

According to a preferred embodiment, the method of the invention comprises heat treating the spreadable cream composition, preferably emulsified, at 60-130° C. for 3-1800 seconds, more preferably 70-95° C. for 15-1200 seconds, most preferably 75-95° C. for 15-900 seconds, preferably by the use of a scraped surface heat exchanger, followed by hot filling the emulsified spreadable cream composition in heat-treated containers and sealing of the filled containers.

According to another preferred embodiment, the method of the invention comprises filling the emulsified spreadable cream composition into containers and sealing the containers, followed by heat treating the filled containers at 60-130° C. for 3-1800 seconds, more preferably 70-95° C. for 15-1200 seconds, most preferably 75-95° C. for 15-900 seconds.

Preferably, the spreadable cream has a shelf life of at least 6 months, more preferably at least 9 months.

Preferably, the heat treatment step b) and/or the packaging step c) are followed by a step of cooling and/or foreign object detection of the shelf-stable spreadable cream.

In yet another aspect, the present invention refers to the shelf-stable spreadable cream obtained by the method of the present invention.

It has been surprisingly found in fact that the combination of legumes and nuts, in the amounts of the present invention, provides the necessary protein and lipid profile to give rise to a phase-stable emulsion.

Without wishing to be bound by any theory, it is thought that the presence of the legume proteins, which are able to act as natural emulsifying agents, enable the formation, and maintenance over time, of an emulsion between the aqueous and the oil phases of the spreadable cream composition.

The emulsifying properties of the legumes are, moreover, such as to allow a comparatively high moisture content in the spreadable cream of the present invention without compromising the organoleptic qualities of the spreadable cream.

In particular, with reference to certain embodiments of the invention, the high performance treatment, in particular the refining of the nuts and legume(s) (flour) in a ball mill refiner reduces their average granule size to a considerable degree, which is particularly effective in maximising the emulsifying properties of the legume proteins when they are immersed in an aqueous phase.

Moreover, the particle size reduction of at least some of the ingredients of the spreadable cream composition results in a smoother texture and as a consequence greater palatability.

Further, the presence of legumes and nuts in the spreadable cream composition has the advantage of making available a shelf-stable spreadable cream that is healthier and more nutritionally wholesome than its conventional counterparts for the following reasons.

Thanks to the presence of nuts, which contain oil, the shelf-stable spreadable cream of the present invention does not require the addition of other oils to the spreadable cream composition. It is well known that oils are calorie-rich, contributing 9 Kcal per gram of oil. On the other hand, nuts have varying energetic values averaging around 6.5 Kcal per gram and at the same time contribute various other macro- and micronutrients such as dietary fiber, vitamins and minerals, as well as essential fatty acids such as omega-3 and omega-6 fatty acids, the former in particular having cardio-protective effects.

By the combination of nuts and legumes, the overall caloric content of the spreadable cream is thus made to be lower than its conventional counterparts, while its nutrient quality is considerably improved.

Moreover, it is known that, unlike animal-derived food, most plant foods do not exhibit an optimal amino acid profile and suffer from the drawback of having the so-called "limiting (essential) amino acid(s)". Essential amino acids are defined as those that cannot be synthesized by the organism and must therefore be supplied by the diet. Essential amino acids for human beings are histidine, isoleucine, leucine, lysine, methionine, phenylalanine, threonine, tryptophan and valine. If a diet is inadequate in any essential amino acid, protein synthesis cannot proceed beyond the rate at which that amino acid is available. That amino acid is referred to as the "limiting amino acid".

In nuts, the limiting amino acid is lysine. Legumes such as beans, however, contain relatively high quantities of lysine thus compensating the deficiency of nuts. The limiting amino acids of legumes, on the other hand, is methionine but legumes are good sources of lysine. The combination of legumes and nuts, therefore, can provide a complete amino acid profile, that is to say that all essential amino acids are represented in the spreadable cream of the invention.

Moreover, legumes can have an optimal balance of carbohydrate, dietary fiber and protein contents and, with particular reference to the cannellini beans, provide a pleasant organoleptic contribution.

Furthermore, legumes are rich in both soluble and insoluble fiber. Oligosaccharides such as stachyose, raffinose and verbascose, as well as polysaccharides such as cellulose, are digested in the small intestine and fermented in the colon, and exert a number of beneficial effects.

First of all, insoluble fiber (e.g. cellulose) can act by swelling in the stomach and delaying gastric emptying thus contributing to the feeling of satiety, thus discouraging the consumer from overeating in the context of his overall diet.

Moreover, intestinal transit rate is improved by insoluble fiber, a situation which is correlated to a decreased risk of colon cancer.

Secondly, the above-mentioned oligosaccharides (soluble fibers) can act by interrupting the enterohepatic cycle thus leading to decreased intestinal absorption of cholesterol.

Also, such fibers are linked to lower glucose absorption in the small intestine and hence a lower rise in blood glucose after a meal.

A particular mention should also be made to the contribution of legumes to the so-called "second meal effect". This expression refers to the effect of the first meal on the blood sugar level after eating the second meal. In particular, it has been found that meals that contain fiber-rich legumes slow the digestion and absorption of carbohydrates and keep postprandial blood sugar level increases to a minimum. In addition, meals that contain fiber-rich legumes improve the blood sugar control of the next meal.

It has been suggested that such effect is not ascribable solely to the glycaemic index of the meal but also to the ability of such slowly digestible meal to cause colonic fermentation (with the production of propionate) and delayed gastric emptying, thanks to the presence of fermentable fiber and resistant starches.

This effect, in turn, is linked to the feeling of general satiety long after the meal and hence to the tendency to eat less food in the following meal(s). Legume intake is, in this way, useful in terms of weight loss management over time.

The shelf-stable spreadable cream of the present invention can be a source of fiber. The spreadable cream, in fact can contain 10 to 19 percent of the RDI or the DRV per reference amount customarily consumed of fiber. As it can also contain 3 g or more of dietary fibers/100 g of product, the spreadable cream is also compliant with the definition of "source of fiber" according to the Annex to CE 1924/2006 Regulation.

As it can also contain 20 percent or more of the RDI or the DRV per reference amount customarily consumed of fiber, the spreadable cream of the present invention can also be high in fiber. Moreover, as it can contain 6 g or more of dietary fibers/100 g of product, the spreadable cream is also compliant with the definition of "high fiber" according to the Annex to CE 1924/2006 Regulation.

The shelf-stable spreadable cream of the invention thus has the advantage of being healthy and promoting the consumption of legumes by individuals (for example children) that do not favor such choice in the form in which they are conventionally cooked. By masking the presence of legumes in a product, for example a cocoa-flavored spread, it is possible even for children to easily benefit from the nutritional quality of legumes.

Moreover, legumes and nuts can provide valuable micronutrients, such as minerals and vitamins, in particular, niacin or vitamin $B_3$, potassium, magnesium and phosphorus.

In a preferred embodiment, the shelf-stable spreadable cream of the present invention is low in saturated fatty acids.

The only required saturated fatty acids present in the shelf-stable spreadable cream of the present invention are those deriving from the nuts and the amount of saturated fatty acids in the spreadable cream can be as low as 1 g or below per reference amounts customarily consumed (RACC) and contribute not more than 15% of the total calories of the spreadable cream, in compliance to the definition of "low in saturated fat" provided by the US Code of Federal Regulations (CFR) 21CFR101.62.

In the prior art, saturated fats, such as for example palm oil, are used to provide a suitable spreadability, palatability and texture in the mouth. Palm oil in particular is extensively used in the manufacture of conventional spreadable creams because, as well as being a vegetable oil, it is naturally saturated and therefore semi-solid at room temperature, thus enabling to achieve the desired consistency of a product at room temperature without having to resort to fat hydrogenation.

However, saturated fats in the spread (e.g. palm oil) undergo a process of crystallization of the oil at cool temperatures, which hardens the spread affecting its spreadability and can cause unattractive phase separation within the product. To the contrary, thanks to its composition having a low saturated fatty acid content, the shelf-stable spreadable cream of the present invention can withstand a wide range of temperatures without undergoing phase separation, hardening or thinning Moreover, as a high content of saturated fatty acids is linked to cardiovascular diseases, the shelf-stable spreadable cream of the present invention is healthier in this respect compared to conventional spreads of the same type.

With respect to the sweetening agent component of the shelf-stable spreadable cream of the present invention, and with respect to preferred embodiments of the present invention, grape sugar has the advantage of exhibiting a higher relative sweetness value than sucrose, in particular thanks to the fructose, and as a consequence, less may be used, compared to sucrose, to achieve the desired degree of sweetness. Moreover, fructose exhibits a lower intestinal absorption rate compared to sucrose, thus contributing to a lower glycaemic index of the spreadable cream.

The shelf-stable spreadable cream of the present invention can also be very low in sodium because it can contain less than 35 mg of sodium per RACC, compliant to the definition of "very low in sodium" provided by the US Code of Federal Regulations (CFR) 21CFR101.61. Infact, no salt needs to be added to the composition of the spreadable cream of the invention and the ingredients making up the product are naturally low in sodium.

As explained above, the legume proteins of the shelf-stable spreadable cream of the present invention are able to create a stable emulsion. As a consequence, the incorporation of added emulsifiers of animal (e.g. dairy, such as milk proteins, whey, and milk protein hydrolysates) or plant source, in the composition, is not strictly necessary.

According to a preferred embodiment, the shelf-stable spreadable cream of the present invention thus has the advantage of not containing any added emulsifiers, especially added emulsifiers derived from animal products, such as milk-derived products.

In a preferred embodiment, the shelf-stable spreadable cream of the present invention contains only ingredients of plant origin.

Most of the conventional spreadable creams of the prior art, in fact, contain milk powder or other derivatives of milk and hence contain lactose, which makes the product unsuitable for consumers who are lactose intolerant. A high percentage of the world adult population in fact is unable to digest lactose or has difficulty digesting large quantities of milk-based products. This condition is particularly widespread among Native Americans and people of Asian, African and South American descent. Typical symptoms of lactose-intolerance include gas production, belly pain or cramps and bloating.

Also, the presence of milk-based products in the composition of the above-mentioned products is a drawback in the light of the increasing number of people worldwide that have chosen a "cruelty-free" or vegan diet, which excludes all foods and ingredients of animal origin.

Moreover, the health-conscious consumer tends to prefer the presence of plant-derived ingredients over animal-derived ingredients as the former contain no cholesterol. Hypercholesterolemia is associated, in fact, with cardiovascular disease (linked to the development of atheroma in the arteries).

In a preferred embodiment, the shelf-stable spreadable cream is also cholesterol free because it contains 0 g cholesterol per RACC compliant to the definition of "cholesterol free" provided by the US Code of Federal Regulations (CFR) 21CFR101.62.

In a preferred embodiment, the shelf-stable spreadable cream of the present invention contains no trans fatty acids.

Trans fatty acids, a by-product of the artificial saturation of unsaturated fatty acids (hydrogenation), are in fact considered to be linked to heart disease. They are sometimes used for the purpose of increasing the melting point of the product obtained (typically for the production of margarines).

In a preferred embodiment, the shelf-stable spreadable cream of the present invention is free of chemical preservatives.

An increasing number of health-conscious consumers also favors in fact products that are free of chemical preservatives as they are perceived by the consumer as a negative feature, because they are associated to the presence of unhealthy (or unfamiliar) ingredients.

In a preferred embodiment, the shelf-stable spreadable cream of the present invention is gluten-free.

Conventional spreadable creams in fact, may also contain gluten, making the product unsuitable for those people who suffer from gluten-related disorders, such as celiac disease or non-celiac gluten sensitivity (NCGS). Modified wheat starch is often used in spreadable creams as a thickening agent to improve the texture of the product and its performance during the shelf life. Wheat starch if often contaminated with traces of gluten, therefore a product containing modified starch as a thickening agent is not suitable for gluten intolerant people.

DETAILED DESCRIPTION OF THE PREFERRED EMBODIMENTS

The present invention will be further described making reference to the examples provided hereafter by way of illustrative and non-limiting cases.

Example 1

Figure 1:
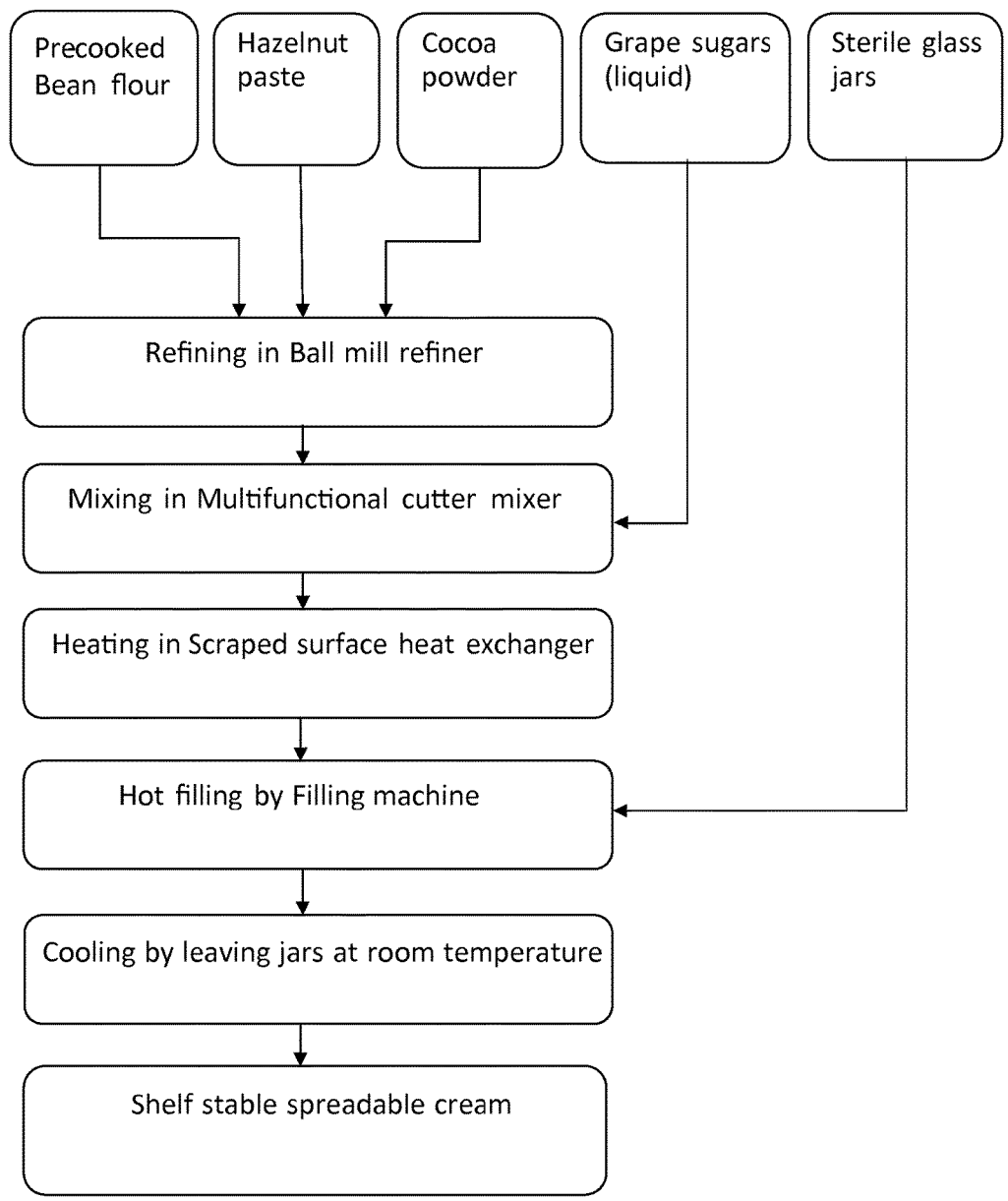
FIG. 1 is a flow chart representing the process for the manufacture of the shelf-stable spreadable cream of the present invention according to a preferred embodiment of the invention.

Production of a Cocoa-Hazelnut Shelf-Stable Spreadable Cream (see FIG. 1)

The following dry ingredients (Table 1) were weighed and dosed in a ball mill refiner (model Roboqbo Qb8-3, produced by Roboqbo, Bologna, Italy) having a rotor shaft with arms for stirring, having a capacity of 8 l, tank dimensions of 85×65×88 cm, and provided with inox stainless steel beads and mixed at a peripheral speed of 80 rpm at room temperature until a smooth semi-processed composition was formed (about 6 hours).

TABLE 1

List of dry ingredients

| Ingredient | Weight (g) |
|---|---|
| Pre-cooked cannellini bean flour | 2560 |
| Hazelnut paste | 4220 |
| Cocoa powder | 420 |

After this operation, the semi-processed paste was mixed, at room temperature, with 12800 g of grape sugars in liquid form (35% (w/v) concentration) in a multifunctional mixer cutter (Roboqbo NS25, produced by Roboqbo, Bologna, Italy) having a capacity of 25 l and provided with a rotor blade until a smooth and emulsified spreadable cream composition was formed.

The emulsified cream thus formed was then heat treated by use of a scraped surface heat exchanger at 80° C. for 50 seconds. The cream was then hot-filled into sterile glass jars. The glass jars had a capacity of 315 ml and were each filled with about 300 ml of cream. The filled glass jars were then sealed with screw caps (of the type having the security capsule for the maintenance of vacuum) and turned upside down so that all the internal surface of the jar and the screw cap had been heat treated by the hot product. The jars were then cooled to 25° C.

Example 2

Figure 2:
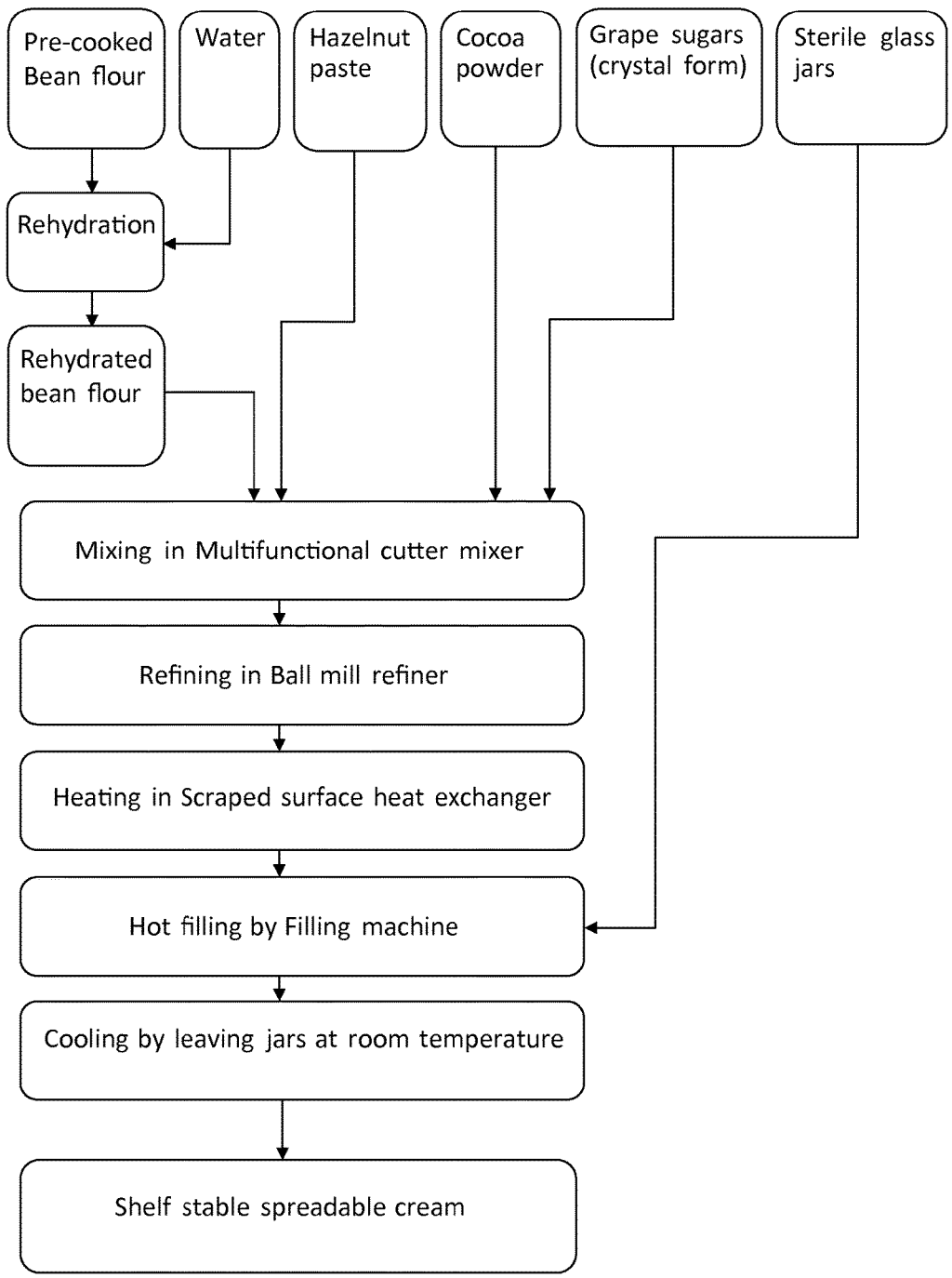
FIG. 2 is a flow chart representing the process for the manufacture of the shelf-stable spreadable cream of the present invention according to another preferred embodiment of the invention.

Production of a Cocoa-Hazelnut Shelf-Stable Spreadable Cream (see FIG. 2)

The following ingredients (Table 2) were weighed and dosed, at room temperature, in a batch tank multifunctional cutter mixer (Roboqbo NS25, produced by Roboqbo, Bologna, Italy) having a capacity of 25 l and provided with a rotor blade and mixed to obtain a semi-processed composition.

TABLE 2

List of ingredients

| Ingredient | Weight (g) |
|---|---|
| Pre-cooked rehydrated cannellini bean flour | 7040 |
| Hazelnut paste | 4220 |
| Cocoa powder | 420 |
| Grape sugars in crystal form | 8320 |

The content was then transferred to a ball mill refiner (Roboqbo Qb25-3, produced by Roboqbo, Bologna, Italy) having a rotor shaft with arms for stirring, having a capacity of 25 l, tank dimensions of 110×98×155 cm, and provided with inox stainless steel beads and mixed at a peripheral speed of 80 rpm at room temperature until a smooth and emulsified spreadable cream composition was formed (about 6 hours).

The emulsified cream thus formed was then heat treated by use of a scraped surface heat exchanger at 80° C. for 50 seconds. The cream was then hot-filled into sterile glass jars. The glass jars had a capacity of 315 ml and were each filled with about 300 ml of cream. The filled glass jars were then sealed with screw caps (of the type having the security capsule for the maintenance of vacuum) and turned upside down so that all the internal surface of the jar and the screw cap had been heat treated by the hot product. The jars were then cooled to 25° C.

Example 3

Characteristics of the Cocoa-Hazelnut Shelf-Stable Spreadable Cream

The following parameters of the shelf-stable spreadable cream of Example 1 were measured after production: water activity ($a_w$), moisture content, viscosity, pH, presence of phase separation. The following Table 3 lists the method of measurement and the measurement value for each parameter. Each measurement value is an average of three measurements.

TABLE 3

Measurement values of parameters of the shelf-stable spreadable cream of Example 1

| Parameter | Method of measurement | Measurement value |
|---|---|---|
| Water Activity ($a_w$) | Dew point method. Aqualab water activity meter T4e (Decagon Devices, USA) | 0.77 |
| Moisture content (MC %) | Drying with an air-ventilated oven (measurement of the weight loss) | 25.3 |

TABLE 3-continued

Measurement values of parameters of the shelf-stable spreadable cream of Example 1

| Parameter | Method of measurement | Measurement value |
|---|---|---|
| Viscosity | Brookfield viscometer @ 12 RPM and 20° C. | 38000 cP |
| pH | pH meter | 5.5 |
| Presence of phase separation | Visual | No |

The nutritional information of the shelf-stable spreadable cream of Example 1 was calculated, based on the ingredient composition of the spreadable cream using, as reference, official databases (INRAN, USDA). The results are shown in Table 4, which includes the contents of carbohydrate (including sugars and dietary fiber), fat (including the content of mono- and poly-unsaturated fatty acids, saturated fatty acids and trans fatty acids), protein, and energetic value per 100 g. Considering two tablespoons (38 g) a standard serving size for this product type, the mentioned values are also expressed per serving size. As required by the Food and Drug Administration (FDA), values for vitamin A, vitamin C, calcium and iron are listed in Table 4.

TABLE 4

Nutritional composition of the shelf-stable spreadable cream of Example 1

| Nutritional value | Value/100 g | Value/serving size |
|---|---|---|
| Calories | 337.8 Kcal | 125 Kcal |
| Total Fat | 13.6 g | 5 g |
| Saturated Fat | 1.3 g | 0.5 g |
| Trans Fat | 0 g | 0 g |
| Polyunsaturated Fat | 1.9 g | 0.7 g |
| Monounsaturated Fat | 9.8 g | 3.6 g |
| Cholesterol | 0 mg | 0 mg |
| Sodium | 41.7 mg | 15.4 mg |
| Total Carbohydrate | 49.7 g | 18.3 g |
| Dietary Fiber | 6 g | 2.2 g |
| Sugars | 42.8 g | 15.8 g |
| Proteins | 6.2 g | 2.3 g |
| Vit. A | 0.742 µg | 0.274 µg |
| Vit. C | 1.71 mg | 0.63 mg |
| Calcium | 42.0 mg | 15.5 mg |
| Iron | 2.4 mg | 0.89 mg |

Example 4

Sensory Evaluation

A sensory panel was set up to compare the shelf-stable spreadable cream of the present invention with a market leader cocoa-hazelnut spreadable cream in Italy, Nutella® (Ferrero SpA, Italy).

A sensory panel of 9 evaluators was set up and the panelists were asked to rate the test spreads according to the following parameters: smell (hazelnut note, cocoa note, off notes), taste (hazelnut note, cocoa note, off notes, sweetness), texture (spreadability, stickiness), overall acceptability.

The scores ranged from 1 to 9, where 1 means that the parameter being measured is poorly represented and 9 means that the parameter being measured is highly represented.

The product being analysed was at room temperature during the tasting.

The results are presented in following Table 5 and the legend of the scores in presented in following Table 6.

TABLE 5

Results of sensory analysis test

|  |  | 1 | 2 | 3 | 4 | 5 | 6 | 7 | 8 | 9 | SCORE |
|---|---|---|---|---|---|---|---|---|---|---|---|
| SMELL |  |  |  |  |  |  |  |  |  |  |  |
| Hazelnut note | Invention | 4 | 5 | 7 | 5 | 2 | 5 | 5 | 4 | 4 | 4.5 |
|  | Competitor | 5 | 5 | 6 | 4 | 3 | 4 | 4 | 6 | 7 | 4.8 |
| Cocoa note | Invention | 3 | 3 | 4 | 5 | 3 | 3 | 5 | 4 | 4 | 3.8 |
|  | Competitor | 4 | 5 | 5 | 3 | 7 | 4 | 6 | 5 | 6 | 5 |
| Off notes | Invention | 1 | 1 | 1 | 3[a] | 1 | 1 | 1 | 1 | 1 | 1.2 |
|  | Competitor | 1 | 1 | 1 | 7[b] | 1 | 1 | 1 | 1 | 1 | 1.6 |
| TASTE |  |  |  |  |  |  |  |  |  |  |  |
| Hazelnut note | Invention | 3 | 5 | 6 | 6 | 5 | 6 | 5 | 5 | 6 | 5.2 |
|  | Competitor | 5 | 5 | 4 | 5 | 3 | 7 | 4 | 6 | 7 | 5.1 |
| Cocoa note | Invention | 2 | 3 | 4 | 3 | 4 | 4 | 4 | 3 | 4 | 3.4 |
|  | Competitor | 4 | 5 | 6 | 5 | 4 | 3 | 6 | 7 | 8 | 5.3 |
| Off notes | Invention | 2[c] | 1 | 1 | 1 | 1 | 1 | 1 | 1 | 1 | 1.1 |
|  | Competitor | 1 | 1 | 1 | 7[d] | 1 | 1 | 1 | 1 | 1 | 1.6 |
| Sweetness | Invention | 5 | 5 | 4 | 5 | 6 | 5 | 4 | 4 | 4 | 4.6 |
|  | Competitor | 7 | 8 | 7 | 8 | 7 | 7 | 7 | 7 | 7 | 7.2 |
| TEXTURE |  |  |  |  |  |  |  |  |  |  |  |
| Spreadability | Invention | 3 | 5 | 4 | 5 | 7 | 5 | 4 | 3 | 4 | 4.4 |
|  | Competitor | 5 | 5 | 5 | 4 | 6 | 4 | 6 | 7 | 6 | 5.3 |

TABLE 5-continued

Results of sensory analysis test

|  |  | 1 | 2 | 3 | 4 | 5 | 6 | 7 | 8 | 9 | SCORE |
|---|---|---|---|---|---|---|---|---|---|---|---|
| Stickiness | Invention | 5 | 7 | 5 | 6 | 1 | 5 | 7 | 5 | 4 | 5 |
|  | Competitor | 7 | 5 | 5 | 5 | 3 | 7 | 4 | 4 | 8 | 5.3 |
| OVERALL | Invention | 5 | 5 | 4 | 8 | 7 | 8 | 6 | 5 | 4 | 5.7 |
| ACCEPTABILITY | Competitor | 6 | 7 | 5 | 5 | 7 | 4 | 4 | 2 | 8 | 5.3 |

[a] Comment from panelist: ripe fruit
[b] Comment from panelist: sugar
[c] Comment from panelist: grape
[d] Comment from panelist: sugar

TABLE 6

Legend of the scores of sensory analysis test
LEGEND

|  | Hazelnut note, cocoa note | Off-notes | Sweet-ness | Spread-ability | Stickiness | Overall acceptability |
|---|---|---|---|---|---|---|
| 1 | Too light | Absent | Not sweet | Not spreadable | Not sticky | I do not like it |
| 5 | Ideal | Present | Ideal | Ideal | Ideal | I like it |
| 9 | Too strong | Too much present | Too sweet | Too fluid | Too sticky | I like it a lot |

Example 5

Production of a Low-Calorie Cocoa-Hazelnut Shelf-Stable Spreadable Cream

The following dry ingredients (Table 7) were weighed and dosed in ball mill refiner (model Roboqbo Qb8-3, produced by Roboqbo, Bologna, Italy) having a rotor shaft with arms for stirring, having a capacity of 8 l, tank dimensions of 85×65×88 cm, and provided with inox stainless steel beads and mixed at a peripheral speed of 80 rpm at room temperature until a smooth semi-processed composition was formed (about 6 hours).

TABLE 7

List of dry ingredients

| Ingredient | Weight (g) |
|---|---|
| Pre-cooked cannellini bean flour | 2560 |
| Hazelnut paste | 4220 |
| Cocoa powder | 420 |

After this operation, the semi-processed paste was mixed, at room temperature, with 12800 g of water in a multifunctional mixer cutter (Roboqbo NS25, produced by Roboqbo, Bologna, Italy) having a capacity of 25 l and provided with a rotor blade until a amooth and emulsified spreadable cream composition was formed.

The emulsified cream composition thus formed was then heat treated by use of a scraped surface heat exchanger at 80° C. for 50 seconds. The cream was then hot-filled into glass jars. The glass jars had a capacity of 315 ml and were each filled with about 300 ml of cream. The filled glass jars were then sealed with screw caps (of the type having the security capsule for the maintenance of vacuum) and turned upside down so that all the internal surface of the jar and the screw cap had been heat treated by the hot product. The jars were then cooled to 25° C.

Example 6

Characteristics of the Low-Calorie Cocoa-Hazelnut Shelf-Stable Spreadable Cream

The nutritional composition of the shelf-stable spreadable cream of Example 5 was calculated, based on the ingredient composition of the spreadable cream using, as reference, official databases (INRAN, USDA). The results are shown in Table 8, which includes the contents of carbohydrate (including sugars and dietary fiber), fat (including the content of mono- and poly-unsaturated fatty acids, saturated fatty acids and trans fatty acids), protein, and energetic value per 100 g. Considering two table spoons (38 g) a standard serving size for this product type, the mentioned values are also expressed per serving size. As required by FDA, values for vitamin A, vitamin C, calcium and iron are listed in Table 8.

TABLE 8

Nutritional composition of the shelf-stable spreadable cream of Example 5

| Nutritional value | Value/100 g | Value serving size |
|---|---|---|
| Calories | 176.6 Kcal | 65.3 Kcal |
| Total Fat | 13.6 g | 5 g |
| Saturated Fat | 1.3 g | 0.5 g |
| Trans Fat | 0 g | 0 g |
| Polyunsaturated Fat | 1.9 g | 0.7 g |
| Monounsaturated Fat | 9.8 g | 3.6 g |
| Cholesterol | 0 mg | 0 mg |
| Sodium | 22.3 mg | 8.3 mg |
| Total Carbohydrate | 8.1 g | 3 g |
| Dietary Fiber | 6 g | 2.2 g |
| Sugars | 1.2 g | 0.45 g |
| Proteins | 6.2 g | 2.3 g |
| Vit. A | 0.742 µg | 0.274 µg |
| Vit. C | 1.71 mg | 0.63 mg |
| Calcium | 42.0 mg | 15.5 mg |
| Iron | 2.4 mg | 0.89 mg |

The spreadable cream had a creamy texture, a good taste, and had a good appearance. It was easily spreadable on bread using a knife or a spoon.

The invention claimed is:

1. A shelf-stable spreadable cream composition having a creamy texture, comprising, in dry weight percent, based on the total dry weight of the spreadable cream, 5-30% legumes, wherein said legumes are selected from the group consisting of cannellini beans, navy beans, great northern beans, white beans, kidney beans wax beans, pinto beans and cranberry beans, 5-45% nuts further comprising, 3-15% dietary fiber; 10-20% total fats; less than 5% saturated fatty acids and 1-10% legume protein, wherein water activity ($a_w$) of the shelf-stable spreadable cream is between 0.60 and 0.85 wherein the shelf-stable spreadable cream has a moisture content, in weight percent, of at least 20%, based on the total weight of the spreadable cream;

wherein the legumes are chosen from the group consisting of the common beans having in dry weight percent, based on the total weight of the legumes, a protein content between 17 and 30%, a total carbohydrate content, including dietary fibre, comprised between 45 and 75%, a lipids content comprised between 1 and 5%, and an ash content comprised between 2.5 and 4.5%;

wherein the shelf-stable spreadable cream is an oil-in-water emulsion;

wherein the shelf-stable spreadable cream has a viscosity at 20° C. comprised between 8,000 and 200,000 cP measured with a Brookfield viscometer at 12 RPM, wherein the legumes and the nuts have an average particle size of 500 μm or less; and wherein the spreadable cream has an energetic value of 450 Kcal per 100 g of product or lower.

2. The shelf-stable spreadable cream of claim 1, wherein said legumes comprise all edible parts of a whole legume.

3. The shelf-stable spreadable cream of claim 1 further comprising, in dry weight percent, based on the total dry weight of the spreadable cream, 1-70% of a sweetening agent.

4. The shelf-stable spreadable cream of claim 1 further comprising, in dry weight percent, based on the total dry weight of the spreadable cream, 1-30% of a flavoring ingredient.

5. A method for the production of the shelf-stable spreadable cream composition according according to claim 1 comprising the steps of:

a) mixing the ingredients of a spreadable cream composition comprising, in dry weight percent, based on the total dry weight of said spreadable cream composition, 5-45% legumes and 5-45% nuts, thus obtaining an emulsified spreadable cream composition;

b) heat treating said spreadable cream composition of step a); and c) packaging said emulsified spreadable cream composition wherein said mixing step a), is optionally preceded by a pre-mixing step a') of two or more ingredients of a spreadable cream composition.

6. Method according to claim 5, wherein said mixing step a) comprises subjecting two or more of the ingredients of said spreadable cream composition to a high performance treatment which comprises any comminuting, compressing, refining, grinding or shearing process capable of inducing both size reducing and mixing of the two or more of the ingredients of said spreadable cream composition.

7. Method according to claim 6, wherein said high performance treatment of mixing step a) is selected from the group comprising: shearing with rotating tools; compressing between rotating cylinders; grinding; refining by both compressing and shearing; and combinations thereof.

8. Method according to claim 6, wherein said high performance treatment of step a) is carried out at a peripheral speed of 20-500 rpm.

9. Method according to claim 6, wherein said high performance treatment of step a) is carried out until an average particle size of said two or more of the ingredients of the spreadable cream composition of 500 μm or less is obtained.

10. Method according to claim 6, wherein in said high performance treatment of step a), said two or more of the ingredients of the spreadable cream composition consist of dry ingredients.

11. Method according to claim 6, wherein, in step a), said high performance treatment is preceded by a pre-mixing step a') of two or more ingredients of a spreadable cream composition.

12. Method according to claim 6, wherein, in step a), said high performance treatment is followed by a step a") of further mixing the ingredients of the spreadable cream composition.

13. Method according to claim 5, wherein said heat treatment of step b) is a sterilization.

14. Method according to claim 5, wherein said step b) of heat treatment comprises subjecting the spreadable cream composition to a heat treatment at 60-130° C. for 3-1800 seconds.

15. A shelf-stable spreadable cream obtainable by the method of claim 5.

* * * * *